No. 782,469. PATENTED FEB. 14, 1905.
C. P. E. SCHNEIDER.
CONTROL APPARATUS FOR RECOILING GUNS.
APPLICATION FILED AUG. 17, 1903.
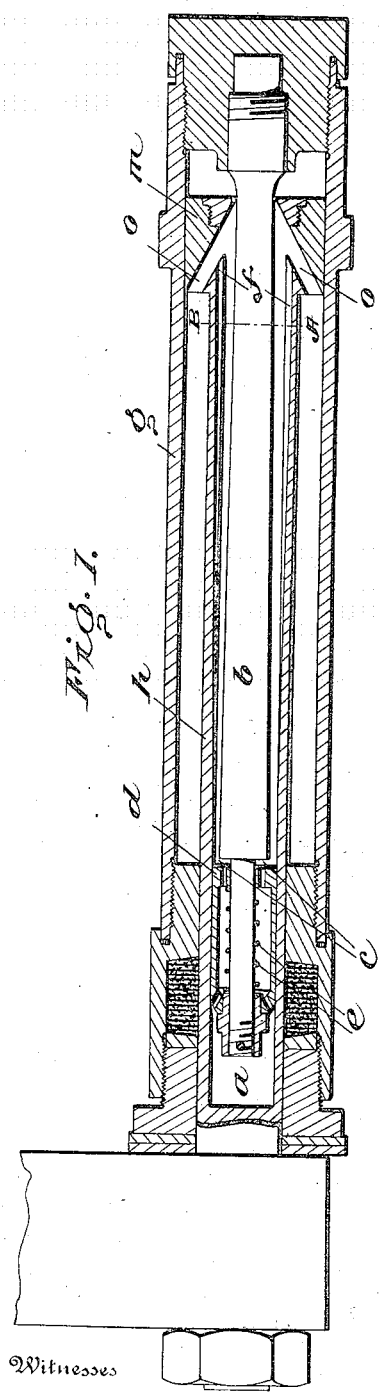
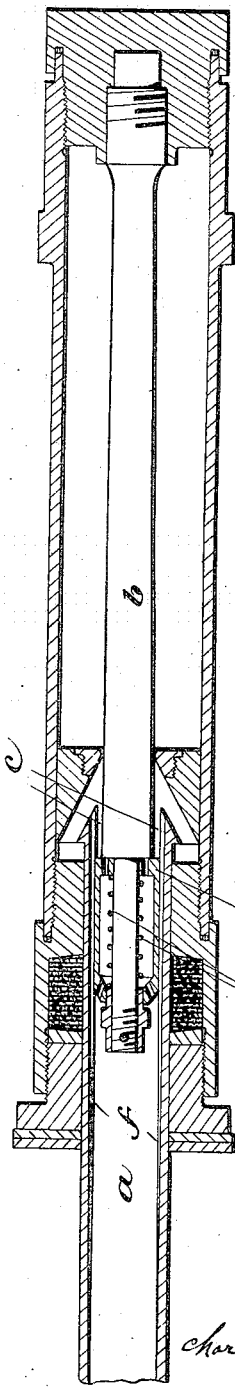
Witnesses
Inventor
Charles P. E. Schneider
By Mauro, Cameron, Lewis & Massie
Attorneys No. 782,469. Patented February 14, 1905.

UNITED STATES PATENT OFFICE.

CHARLES PROSPER EUGÈNE SCHNEIDER, OF LE CREUSOT, FRANCE.

CONTROL APPARATUS FOR RECOILING GUNS.

SPECIFICATION forming part of Letters Patent No. 782,469, dated February 14, 1905.

Application filed August 17, 1903. Serial No. 169,818.

*To all whom it may concern:*

Be it known that I, CHARLES PROSPER EUGÈNE SCHNEIDER, ironmaster, of Le Creusot, Saône-et-Loire, in the Republic of France, have invented certain new and useful Improvements Relating to Control Apparatus for Recoiling Guns; and I do hereby declare the following to be a full, clear, and exact description of the invention, such as will enable others skilled in the art to which it appertains to make and use the same.

In mountings or carriages for quick-firing guns provided with a brake and recuperator the velocity of the moving parts in their return to battery is only moderated toward the end of the movement (that is to say, at the moment the gun is completing its return to battery) by buffers which act for only a small part of this movement. As a result considerable stresses arise in the parts of the mounting, whereby their stability and strength are unduly taxed. In order to obviate this defect, I utilize during the return of the gun to battery a deadening device which operates throughout the entire movement and which, in short, constitutes a hydraulic brake similar to that employed for the recoil. The velocity of the moving parts may then be regulated in such a manner that the duration of time occupied by the return to battery will be very short and the movement will be absorbed at the completion of the return without shock. Although a brake of this kind for the return to battery may be established independently of the recoil-brake, I prefer, for the sake of simplicity in construction, to combine the two brakes, and thereby considerably diminish the number of parts in both.

The present invention consists of a particular arrangement of hydraulic brake with a central controlling and retarding plunger constituting at one and the same time a recoil-brake and a brake for the return to battery. The elements of the recoil-brake serve in this arrangement without necessitating the addition of others for forming the brake for return to battery. The drawings illustrate the complete brake in which this double function is secured by employing the hollow piston-rod of the recoil-brake as a cylinder and the controlling and retarding ram with its cap as a piston for the return brake.

Figure 1 is a longitudinal section showing the relative position of the parts at the beginning of recoil. Fig. 2 is a similar section, but showing the position of the parts at the end of recoil and beginning of return to battery. Fig. 3 is a transverse section on the line A B of Fig. 1.

The recoil-brake comprises the cylinder $g$, the piston $m$, and its hollow stem $h$, attached to the gun, and the controlling and retarding plunger $b$. The whole is filled with liquid. The internal diameter of the housing of the controlling-ram $b$ (*i. e.*, the part of the hollow plunger in which the ram works) is greater than the maximum diameter of the tapering ram. As a result an annular orifice $c$ is formed, which permits the liquid of the brake under pressure to flow readily into the housing of the ram while the latter is leaving it.

When the gun recoils, carrying with it the hollow stem or piston-rod $h$, the liquid contained in the annular space between the stem $h$ and the cylinder $g$ is compressed by the piston $m$. This liquid escapes by the passages $o$ in the piston, which conduct it to a central orifice $c$, whose function is variable and is determined by the retarding-plunger $b$. The liquid reaching the central orifice $c$ under pressure begins to fill the space $a$ left in the hollow piston-rod by the removal of the retarding-plunger $b$ and finally passes the central orifice in advance of the piston into a space where the pressure is lower. In passing into chamber $a$ the liquid under pressure lifts the cap or valve $d$, located at the end of the retarding plunger. At the end of the recoil the valve $d$ closes through the action of the spring $e$, thereby confining the liquid in the chamber $a$ —that is, in the interior of the rod of the piston $m$. The recoil having terminated, a recuperator then acts on the gun to return it to battery and compresses the liquid in the chamber $a$, from which it cannot escape except by the longitudinal grooves $f$, of variable section, located in the walls of the brake-piston rod $h$. These grooves permit the return to battery to be accelerated or retarded or regulated at will.

What I claim is—

1. In control apparatus for recoiling guns, the combination of a brake-cylinder, a piston therein provided with a hollow piston-rod communicating with said cylinder, a retarding tapering plunger located within the hollow piston-rod and passing through the piston, said plunger carrying at its free end a valve adapted to open on recoil and close on return to battery, said hollow piston-rod having internal grooves of varying depth constituting communicating channels between the hollow piston-rod and brake-cylinder whereby the energy of recoil is controlled and the shock of the return to battery is deadened.

2. In control apparatus for recoiling guns, the combination of a brake-cylinder, a piston therein provided with a hollow piston-rod communicating with said cylinder, a retarding tapering plunger located within said hollow piston-rod and passing through the piston, a spring valve-cap located on the free end of the plunger adapted to open on recoil and to close on return to battery, said hollow piston-rod having internal longitudinal grooves of varying depth constituting channels between the hollow piston-rod and brake-cylinder, whereby the energy of recoil is controlled and the shock of return to battery is deadened.

3. In control apparatus for guns, the combination of a brake-cylinder, a piston therein provided with a hollow piston-rod communicating with said cylinder, a tapering plunger fast at one end to said brake-cylinder and extending loosely through the piston into said hollow piston-rod, said plunger being provided at its free end with a shoulder and an extension forming a valve-stem, a perforated valve-cap guided by said stem and fitting the hollow piston-rod, a spring within said cap normally holding said cap against said shoulder thereby closing the end openings in said cap, the said piston-rod having internal longitudinal tapering grooves constituting communicating channels between the hollow piston-rod and brake-cylinder, whereby said tapering plunger and opening through the piston oppose an increasing resistance to recoil and said tapering grooves and valve oppose a similar resistance to counter-recoil.

In witness whereof I have hereunto set my hand in presence of two witnesses.

CHARLES PROSPER EUGÈNE SCHNEIDER.

Witnesses:
JEAN GAMET,
ERNEST VALOT.